US008855986B2

(12) United States Patent (10) Patent No.: US 8,855,986 B2
Castellini et al. (45) Date of Patent: Oct. 7, 2014

(54) ITERATIVE METHOD AND SYSTEM TO CONSTRUCT ROBUST PROXY MODELS FOR RESERVOIR SIMULATION

(75) Inventors: Alexandre Castellini, San Francisco, CA (US); Herve Gross, San Francisco, CA (US); Yifan Zhou, Stanford, CA (US); Jincong He, San Ramon, CA (US); Wen Hsiung Chen, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 323 days.

(21) Appl. No.: 13/223,385

(22) Filed: Sep. 1, 2011

(65) Prior Publication Data

US 2012/0059641 A1 Mar. 8, 2012

Related U.S. Application Data

(60) Provisional application No. 61/380,068, filed on Sep. 3, 2010.

(51) Int. Cl.
*G06G 7/48* (2006.01)
*G01V 99/00* (2009.01)
*E21B 43/00* (2006.01)
*E21B 47/00* (2012.01)
*E21B 49/00* (2006.01)

(52) U.S. Cl.
CPC ............... *G01V 99/00* (2013.01); *E21B 43/00* (2013.01); *E21B 47/00* (2013.01); *G01V 2210/663* (2013.01); *E21B 49/00* (2013.01)
USPC .......................................................... 703/10

(58) Field of Classification Search
CPC ......... E21B 43/00; E21B 47/00; E21B 49/00; G01V 2210/663
USPC .............................................................. 703/10
See application file for complete search history.

(56) References Cited

U.S. PATENT DOCUMENTS

| 6,549,854 | B1 | 4/2003 | Malinverno et al. | |
|---|---|---|---|---|
| 7,657,494 | B2 | 2/2010 | Wilkinson et al. | 706/13 |
| 8,335,677 | B2 * | 12/2012 | Yeten et al. | 703/10 |
| 2004/0254734 | A1 | 12/2004 | Zabalza-Mezghani et al. | |
| 2005/0096893 | A1 | 5/2005 | Feraille et al. | |
| 2007/0192072 | A1 | 8/2007 | Cullick et al. | |
| 2008/0077371 | A1 * | 3/2008 | Yeten et al. | 703/10 |
| 2008/0162100 | A1 | 7/2008 | Landa | 703/10 |
| 2010/0161300 | A1 | 6/2010 | Yeten et al. | 703/10 |

OTHER PUBLICATIONS

Martin Crick, "Reservoir simulation", Jul. 2010.*

(Continued)

*Primary Examiner* — David Silver

(57) ABSTRACT

A method, system and computer program product is disclosed for utilizing proxy models to evaluate a subterranean reservoir. The method includes constructing a proxy model from a set of sampling points to approximate simulation outputs of a reservoir model. The set of sampling points is updated by adding at least one new sampling point that is selected from a location associated with surface non-linearities such as gradients, curvature, and bending energy. Response surface values at new sampling points and distances to existing sampling points can also be used to evaluate new sampling points. Proxy models are refined with the updated set of sampling points until the proxy model satisfies a predetermined stopping criterion, such as when a predetermined number of iterations are reached or when changes to the response surface are below a predetermined threshold.

27 Claims, 13 Drawing Sheets

(56) References Cited

OTHER PUBLICATIONS

Yu et al, "Coevolution of Simulator Proxies and Sampling Strategies for Petroleum Reservoir Modeling", 978-1-4244-2959-2/09/$25.00, 2009 IEEE.*

Avanse, "Use of Proxy Model in the Selection of Production Strategy and Economic Evaluation of Petroleum Fields", Oct. 2009, 10 pages, SPE-129512-STU.*

Rouset, "Building fast proxies for optimization of thermal reservoir simulation", Dec. 2011.*

Friedmann, F., Chawathe, A. and Larue, D., "Assessing Uncertainty in Channelized Reservoir Using Experimental Design", SPE Reservoir Evaluation and Engineering, Aug. 2003.

Yeten, B., Castellini, A., Guyaguler, B. and Chen, W., "A Comparison Study on Experimental Design and Response Surface Methodologies", SPE 93347, SPE Reservoir Simulation Symposium, Houston, TX, Jan. 2005.

Li, B., Friedmann, F., "Novel Multiple Resolutions Design of Experiment/Response Surface Methodology for Uncertainty Analysis of Reservoir Simulation Forecasts", SPE 92853, SPE Reservoir Simulation Symposium, Houston, TX, Jan. 2005.

Eidi, A.L., Holden, L., Reiso, E., and Aanonsen, S. I.: "Automatic History Matching by use of Response Surfaces and Experimental Design," 4th European Conference on the Mathematics of Oil Recovery, Roros, Norway, Jun. 1994.

Landa, J.L. and Guyaguler, B.: "A Methodology for History Matching and the Assessment of Uncertainties Associated with Flow Prediction," SPE 84465, SPE ATCE, Denver, CO, Oct. 2003.

Castellini, A., Landa, J.L., and Kikani, J., "Practical Methods for Uncertainty Assessment of Flow Predictions for Reservoirs with Significant History—A Field Case Study", $9^{th}$ European Conference on the Mathematics of Oil Recovery, Cannes, France, Aug. 2004.

King, G.R, Lee, S., Alexandre, P., Miguel, M., Blevens, M., Pillow, M., and Christie, G., "Probabilistic Forecasting for Mature Fields with Significant Production History: A Nemba Field Case Study", SPE 95869, SPE ATCE, Dallas, TX, Oct. 2005.

Guyaguler, B. and Home, R., "Uncertainty Assessment of Well Placement Optimization", SPE 71625, SPE ATCE, New Orleans, LA, Sep. 2001.

Yeten, B., Durlofsky, L.J., and Aziz, K., "Optimization of Nonconventional Well Type, Location and Trajectory", SPE 77565 ,SPE ATCE, San Antonio, TX, Sep. 2002.

PCT International Search Report regarding PCT/US2011/050162 dated Apr. 16, 2012 (6 pgs).

Castellini, A., et al.; "An Iterative Scheme to Construct Robust Proxy Models"; B038, EXMOR XII—$12^{th}$ European Conference on the Mathematics of Oil Recovery, Sep. 2010, Oxford, UK.

Li, B., et al.; "A Novel Response Surface Methodology Based on "Amplitude Factor" Analysis for Modeling Nonlinear Responses Caused by Both Reservoir and Controllable Factors"; SPE 95283, Oct. 2005, pp. 1-15.

* cited by examiner

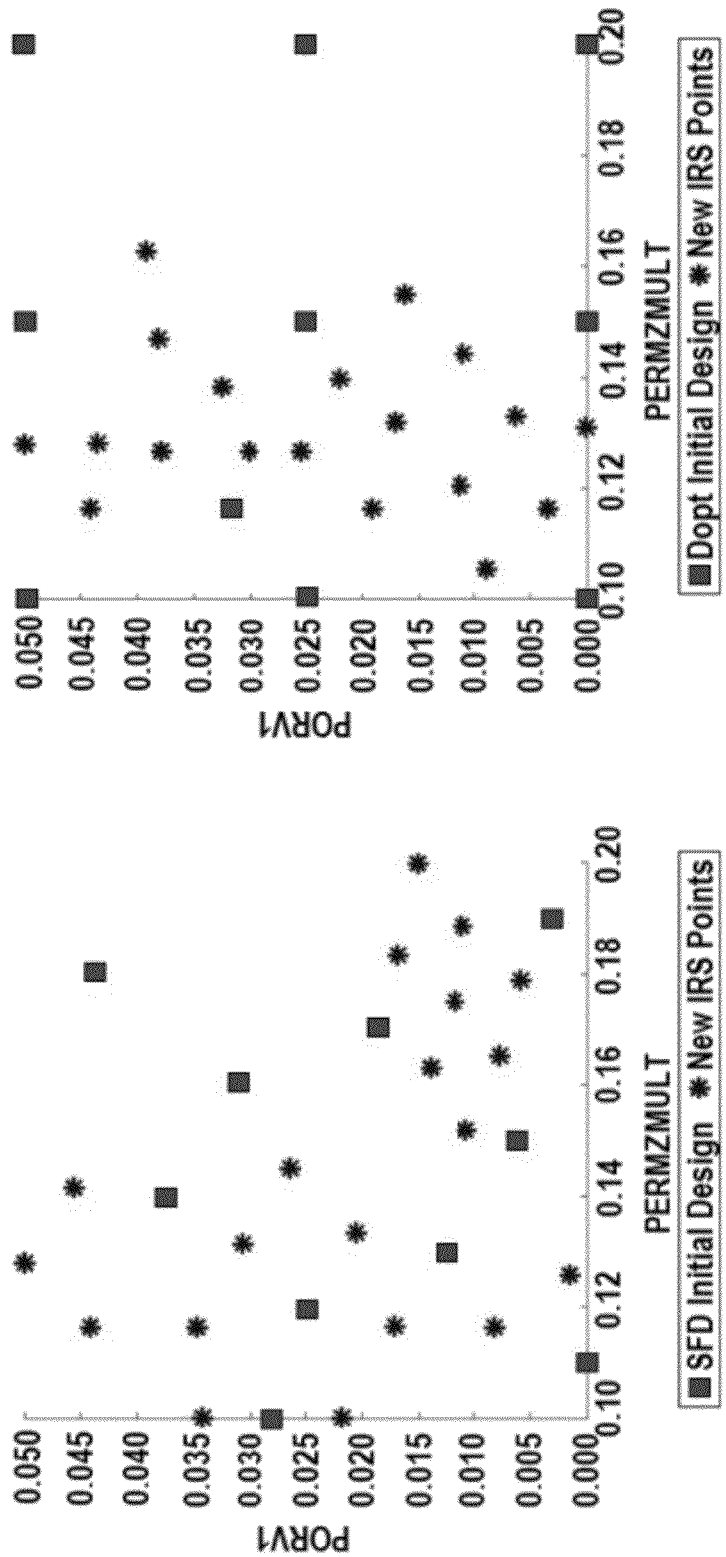

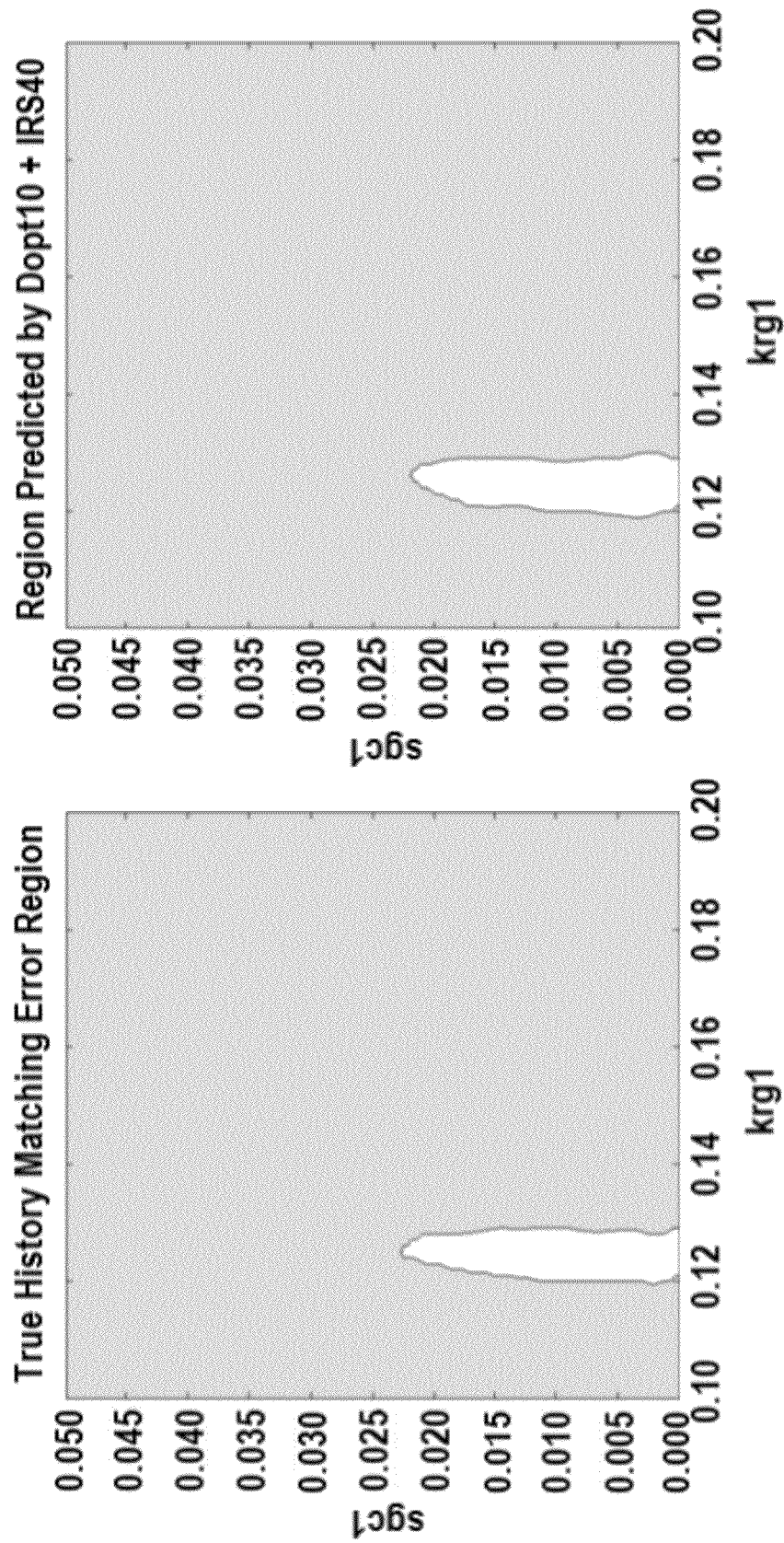

US 8,855,986 B2

ITERATIVE METHOD AND SYSTEM TO CONSTRUCT ROBUST PROXY MODELS FOR RESERVOIR SIMULATION

CROSS-REFERENCE TO A RELATED APPLICATION

The present application for patent claims the benefit of U.S. Provisional Application bearing Ser. No. 61/380,068, filed on Sep. 3, 2010, which is incorporated by reference in its entirety.

TECHNICAL FIELD

The present invention generally relates to reservoir simulation, and more particularly, to a method, system and computer program product for utilizing proxy models to evaluate a subterranean reservoir.

BACKGROUND

Quantifying and understanding uncertainty plays a key role in reservoir management as the quality and robustness of business decisions are greatly impacted by the uncertainty estimates of the variables involved in the decision making process. Uncertainty arises due to scarcity of data, inaccuracy of measured data, and the inherent variability and heterogeneity in the geological formation and fluid properties. As a result, reservoir simulation model outputs, such as forecasted hydrocarbon production, may have significant uncertainty due to the variety of uncertain input parameters.

Monte Carlo simulation is an approach commonly used for uncertainty quantification. In Monte Carlo simulation, a large number of realizations of random inputs from a search space are generated and solved to obtain a set of model outputs, which can be further analyzed statistically. Monte Carlo simulation is conceptually straightforward and easy to implement, however, it requires a large computational effort. In particular, a large number of subsurface realizations and computationally intensive flow model simulations are typically needed to obtain statistically accurate results. Accordingly, Monte Carlo simulations are cost prohibitive in most real applications of reservoir simulation, especially for large scale problems.

Proxy models have been used as alternatives to Monte Carlo simulation for improving the efficiency of the traditional asset development workflows such as uncertainty assessments, history-matching and optimization of development plans. Proxy models are analytical functions calibrated to mimic the response of the numerical reservoir simulator, thus allowing for a fast evaluation of multiple combinations of input parameters. While proxy models are more computationally efficient compared to Monte Carlo simulation, they can require large amounts of training in order to accurately approximate the simulation responses. As the input parameter space increases, the amount of training needed for a proxy model diminishes the benefits obtained from the fast evaluations. Accordingly, because the cost of training grows exponentially with the parameter space dimension, applicability of proxy models has been limited to relatively small dimensional parameter spaces.

Furthermore, proxy models are typically constructed by statistical design, such as by using experimental design methods. A key disadvantage of experimental design methods is that they do not take into account the full probability distributions of the parameters consistently while creating the proxy model. In particular, the entire probability density functions (PDFs) are only used during post-processing and not used for sampling and design. Because all samples are equally weighted for proxy model generation, there is an inherent assumption that the distributions of these parameters are uniform. As a result, experimental design methods may not be appropriate when parameter distributions are arbitrary, which is common in petroleum applications. More particularly, linear regression techniques are the most popular methods to create analytical proxy models. However, the resulting proxies can be poor predictors of reservoir performance when strong non-linear effects occur.

Accordingly, a method is needed for reservoir evaluation that avoids the aforementioned shortcomings. In particular, a robust and efficient method is needed for generating proxy models over relatively large dimensional parameter spaces where non-linearities are common, such as when being applied to large scale reservoir simulation problems.

SUMMARY

A method is disclosed for evaluating a subterranean reservoir. The method comprises constructing a proxy model that approximates a simulation output of a reservoir model from a set of sampling points. At least one new sampling point is selected from a location associated with surface non-linearities of the proxy model. The set of sampling points is updated by adding new sampling points. The proxy model is refined using the updated set of sampling points. Updating of sampling points and refinement of the proxy model continue until the proxy model satisfies a predetermined stopping criterion, such as a change between two successive proxy models being less than a predetermined threshold.

A system for evaluating a subterranean reservoir is also disclosed. The system includes a database, a computer processor, and a software program. Reservoir models representing subterranean reservoirs, input variable distributions, simulation outputs of the reservoir models, sampling points, and proxy models are examples of data that can be stored by the database. The computer processer is configured to receive stored data from the database and execute software using the stored data. The software program, which is executable on the computer processer, includes a sampling point module and a proxy model module. The sampling point module is configured to generate a set of sampling points that are spread across the input variable distribution and update the set of sampling points by adding at least one new sampling point that is selected from a location that is associated with surface non-linearities. The proxy model module is configured to construct the proxy models from the set of sampling points such that the proxy models approximate the simulation outputs of the reservoir model. In some embodiments, the software program can also include a simulation module configured to simulate the reservoir model for the set of sampling points that are spread across the input variable distribution to obtain the simulation outputs of the reservoir model. The system can also include a display that communicates with the proxy model module such that results from using the proxy models are transformed into image representations that are output to the display.

A computer program product is also disclosed. The computer program product comprises a non-transitory computer usable medium having a computer readable program code embodied therein. The computer readable program code comprises a sampling point module and a proxy model module. The sampling point module is configured to generate a set of sampling points that are spread across an input variable distribution and update the set of sampling points by adding at least one new sampling point that is selected from a location that is associated with surface non-linearities. The proxy model module is configured to construct proxy models from the set of sampling points such that the proxy models approximate simulation outputs of a reservoir model.

In one or more embodiments of the present invention, proxy models (e.g., thin-plate spline regression models) are utilized to evaluate the subterranean reservoir. For example, proxy models can be utilized to forecast simulation outputs of the reservoir model or to test asset development procedures.

In one or more embodiments of the present invention, new sampling points are selected based on a value of the proxy model at a new sampling point location, a scalar gradient of the proxy model at a new sampling point location, a bending energy of the proxy model at a new sampling point location, a curvature of the proxy model at a new sampling point location, a distance between locations of each sampling point used to construct the proxy model and a new sampling point location, or a combination thereof. The sampling points can represent global reservoir properties and/or local field properties.

BRIEF DESCRIPTION OF THE DRAWINGS

FIGS. 8A, 8C, 8E and 8G show the locus for the reference response surface shown in FIG. 7 and FIGS. 8B, 8D, 8F, and 8H show the evolution of the locus for a response surface over various iterations, in accordance with an embodiment of the present invention.

FIGS. 9A and 9B are schematic views showing new sampling points obtained during the refinement of response surfaces initially generated using space-filling (9A) and D-Optimal (9B) designs, in accordance with embodiments of the present invention.

FIGS. 10A and 10B are schematic views comparing the reference envelope (10A) for the reference response surface shown in FIG. 7 with the envelope obtained using iterative response surfaces (10B), in accordance with an embodiment of the present invention.

DETAILED DESCRIPTION

Figure 1:
FIG. 1 is a schematic environmental view of a reservoir model.

Proxy models, such as response surfaces, are mathematical functions calibrated to mimic or represent the response of output from one or more numerical simulators when using different combinations of input parameters. In general, "numerical simulation" or "reservoir simulation" refers to specific mathematical representations of a physical hydrocarbon reservoir. Simulation models, also called reservoir or geologic models, are used to conduct numerical experiments (simulations) to quantify the past performance of the reservoir and predict its future performance to determine profitable operating strategies and make other reservoir management decisions. Such models typically vary in degrees of complexity and uncertainty. Proxy models, when used in accordance with embodiments of the present invention, can advantageously help reduce the number of full-field flow simulations required for simulation-intensive asset development techniques, methods, or processes such as uncertainty quantification, history-matching, field optimization, or a combination thereof.

The elaboration of a predictive proxy model is typically responsive to elements comprising: a proper sampling of the simulator inside the input parameter space, a mathematical formulation to interpolate between the sampled locations, and a robust validation strategy.

With respect to the element of sampling of the simulator inside the input parameter space, independence between the design and the model is one of the main faults associated with sampling techniques, such as experimental design. Such independence makes it very difficult, if not impossible, for a design to capture non-linear model behaviors a priori. Experimental design techniques, in other words, are typically blind to their outcome and only consider the input variable distributions when locating sampling points. In accordance with embodiments of the present invention, the use of iterative processes or methods helps restore the ability to tune a design such that non-linearities are captured during proxy model construction by proceeding and adjusting the sampling locations iteratively. Thus, iterative sampling focuses the search on non-linear regions during proxy model construction.

To illustrate the benefits of using iterative methods or processes, consider the example where the user can only perform a total of 30 full-field simulations. Such limitations may be due to some resource or time constraint imposed on the project. Traditional approaches would typically include using experimental design techniques to locate 30 sampling points that provide a good spread across the search space. The 30 simulations would then be launched, and a response surface would be constructed from these 30 points. Such approaches may fail to capture non-linearities as the 30 sampling points inherently assume that the distribution of parameters is uniform. However, response surfaces according to embodiments of the present invention can be refined during construction using an iterative approach. For example, the iterative approach can separate the 30 simulation runs into batches of runs, such as five batches of six runs each (the number of runs per batches can be defined). Each batch of runs is then analyzed to understand the system response, and an optimization problem can be solved between iterations to locate the next batch of points where the model needs additional refinement.

As will be described, the location of the most informative points—points in the sampling space where more information is desired—is optimized between iterations. The term "optimize" (as well as derivatives, other forms of this term, and linguistically related words and phrases), as used herein, are not intended to be limiting in the sense of requiring the present invention to find the best mathematical solution or to make the best decision. Rather, the terms can describe working towards a solution which may be the best available solution, a preferred solution, or a solution that offers a specific benefit within a range of constraints; or continually improving; or refining; or searching for a high point or a maximum for an objective; or processing to reduce a penalty function.

In one embodiment of the present invention, the iterative method uses thin-plate spline regression models to generate response surfaces. Thin-plate splines are smooth piecewise polynomial functions with well-behaved derivatives. Thin-plate splines advantageously offer convenient analytical properties. A thin-plate spline response surface (s) can be generated at a given iteration from a set of existing points (P). A score function (S) can be used to evaluate candidate sample locations. The candidate sample locations with the highest score value S can be selected to generate the next batch of sampling points.

In one embodiment of the present invention, the score function can be computed for each candidate as follows:

$$S = \epsilon_1 s + \epsilon_2 |\nabla s| + \epsilon_3 \sqrt{(\Delta s)} + \epsilon_4 \kappa(s) + \epsilon_5 d$$

Here, this score sums the contribution of four properties of the response surface (s) calculated from existing points (P) and one distance property (d). Each property is preferably weighted by a coefficient ($\epsilon$). The following provides additional meaning which will be readily appreciated by those skilled in the art for each term of this equation.

$\epsilon_1 s$: this term corresponds to the response surface value evaluated at the candidate location. If $x_{1, 2, \ldots, n}$ is called the n input parameters of the problem, then this term is equal to $s(x_1, x_2, \ldots, x_n)$.

$\epsilon_2 |\nabla s|$: this term corresponds to the scalar gradient of the response surface at the candidate location:

$$|\Delta s| = \left[\left(\frac{\partial s}{\partial x_1}\right)^2 + \left(\frac{\partial s}{\partial x_2}\right)^2 + \ldots + \left(\frac{\partial s}{\partial x_n}\right)^2\right]^{\frac{1}{2}}$$

$\epsilon_3 \sqrt{(\Delta s)}$: this term corresponds to the bending energy of the response surface at the candidate location:

$$(\Delta s) = \sum_{i=1}^{n} \left(\frac{\partial^2 s}{\partial x_i^2}\right)^2 + 2 \sum_{i=1}^{n} \sum_{j=1+i}^{n} \left(\frac{\partial s}{\partial x_i} \frac{\partial s}{\partial x_j}\right)^2$$

$\epsilon_4 \kappa(s)$: this term corresponds to the curvature of the response surface at the candidate location computed for locations x where $\nabla s(x) \neq 0$.

$$\kappa(s) = \frac{\sqrt{s}}{|\nabla s|^2}$$

$\epsilon_5 d$: this term corresponds to a distance between the candidate location and each existing point x(p):

$$d = \sum_{p=1}^{dimP} |x - x(p)|$$

The coefficients $\epsilon$ allow combining the response function value, gradient, curvature, and bending energy to capture the surface non-linearities with an exploration distance that avoids clusters of points in locations already informed. These coefficients are not static and instead are problem-dependent. Furthermore, values of $\epsilon$ are adjusted with each iteration based on the existing points, and the response surface obtained.

To initialize the method or process of an embodiment of the present invention, any appropriate experimental design can be used, such as Plackett-Burman, D-optimal, Latin Hypercube, or Hammersley sequence. The operator specifies a maximum number of iterations, a number of runs (new sampling points) per iteration k, and a convergence criterion to stop if the changes between two successive response surfaces are smaller than a predetermined threshold. Subsequent iterations of the response surface construction can proceed as follows:

1. Using all existing points, generate a thin-plate spline function (s)—the response surface;
2. Generate a large set of candidate locations that sufficiently cover the search space;
3. Calculate the score function S for each point as previously described herein; and
4. Add the candidates with the highest combined score to the next iteration, thus adding new sampling points associated with non-linearities to the existing sampling used to create the response surface.

The procedure can stop when a predetermined convergence criteria is satisfied, such as when the number of iterations requested by the operator is complete or when the changes to the response surface are below the predetermined threshold. The response surface s can then be used to predict simulator responses at unsampled locations and/or test asset development procedures such as uncertainty quantification, history-matching, field optimization, or a combination thereof.

Referring to FIG. 1, a three-dimensional view of an exemplary reservoir 11 is shown, which has been sampled in accordance with an embodiment of the present invention. Reservoir 11 can be any type of subsurface formation in which hydrocarbons are stored, such as limestone, dolomite, oil shale, gas shale, sandstone, or a combination thereof. Reservoir 11 is shown with a plurality of production wells 13 and injector wells 15 that are in fluid communication with a hydrocarbon producing zone of reservoir 11. The shading scale indicates oil saturation in FIG. 1. As will be readily appreciated by those skilled in the art, the iterative experimental points in this embodiment are not drawn on a field view because the samples are taken such that they represent global field properties. For example, these samples can be properties such as permeability distributions, where each "sample" represents the permeability distribution of a different full field. Accordingly, each sample can represent a full three-dimensional field with several differing properties from the other samples.

The sample can be for other properties in addition to permeability. The choice of properties to sample depends on the uncertainties for a particular application, and the associated goals for these uncertainties. The choice of properties to sample is not typically dependent on the chosen sampling or experimental design technique. However, the choice of a design can often affect the number of uncertainties and the desired precision of outcomes. In some embodiments of the present invention, the uncertain properties for sampling are global reservoir properties. In some embodiments, the uncertain properties for sampling are local field properties. Examples of local field properties include the permeability in the neighborhood of a well and the transmissibility of a fault. In some embodiments, the uncertain properties for sampling are a combination of global reservoir properties and local field properties. As will be readily appreciated by those skilled in the art, "reservoir properties" are quantities representing physical attributes (measurable or descriptive) of the formation or rocks containing reservoir fluids. Accordingly, almost any numeric value in a reservoir simulation input deck can be used for sampling, and thus for the construction of an iterative response surface. Additional examples of global and local field properties include:

Net-to-gross distribution for the field, per region, or per grid block;
Porosity distribution for the field, per region, or per grid block;
Permeability distribution for the field, per region, or per grid block;
Residual saturations for the field, per region, or per grid block;
Contact depths (water-oil and/or gas-oil contacts);
Fault transmissibility values;
Relative permeability curves;
Well productivity indices; and
Well constraints such as bottom-hole pressures, minimum or maximum production rates, minimum or maximum injection rates, or a combination thereof.

Considering that the set of simulation output values are dependent on the input parameters/properties and that the true dependency can only be evaluated using numerical reservoir simulation (which tends to be time-consuming), response surfaces are often relied upon to quickly predict the response of simulators. However, these response surfaces are generally only calibrated to a few reservoir simulation generated samples. Iterative response surface techniques are therefore, intelligent ways to construct the response surfaces by carefully choosing which simulation samples to actually run. In particular, the method iteratively selects the most informative combinations of properties based on the outcome of the generated response surface, and adds these new batches of samples to the existing ones for the next generation. For example, this technique can locate where the response surface has sharp curves and places more samples in the curved locations to better capture its shape.

Iterative Response Surface for Green Field Development Forecast and Optimization The construction of iterative response surfaces was applied to a newly offshore sand reservoir. The objective of this example was to obtain a probability distribution function for the cumulative oil production of the field after 10 years in production as a function of five uncertain geological parameters. The geological model for this field included 1,051,200 cells. The production forecasts were subject to five major sources of uncertainty: connate water saturation, rock compressibility, and permeability multipliers in the x, y and z directions. Accordingly, the response surface for this example represents the cumulative field oil production as a function of these five uncertainty sources and can be mathematically expressed as:

$$Q^{oil} = s(S_{wc}, c_r, k_x, k_y, k_z)$$

Figure 2:
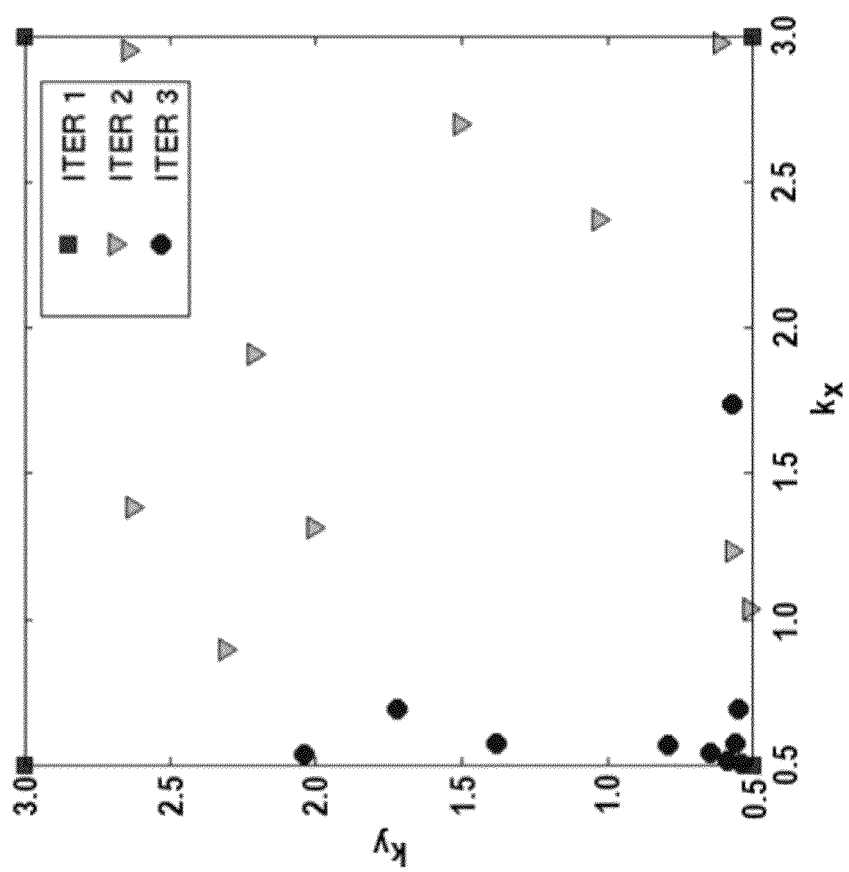
FIG. 2 is a schematic view of the locations of sampling points on a 2D-slice of a five-dimensional search space, in accordance with the an embodiment of the present invention.

FIG. 2 shows the location of sampling points on a 2D-slice of this five-dimensional search space. The initial set of sampling points was generated using a Folded Plackett-Burman design (16 runs). A sufficient number of iterations then followed where each iteration added 10 new sampling points. The initial and additional sampling points used in the iterations are shown in FIG. 2. The initial sampling points used in iteration 1 were generated using a Folded Plackett-Burman design, hence their location at the corners. Iterations 2 and 3 refine the sampling of points according to the score function S previously described herein. In iteration 3, multiple sampling points are added in the lower-left corner of the domain (in the $k_x$, $k_y$ space) as this is the location of the sharpest non-linearities.

Figure 3:
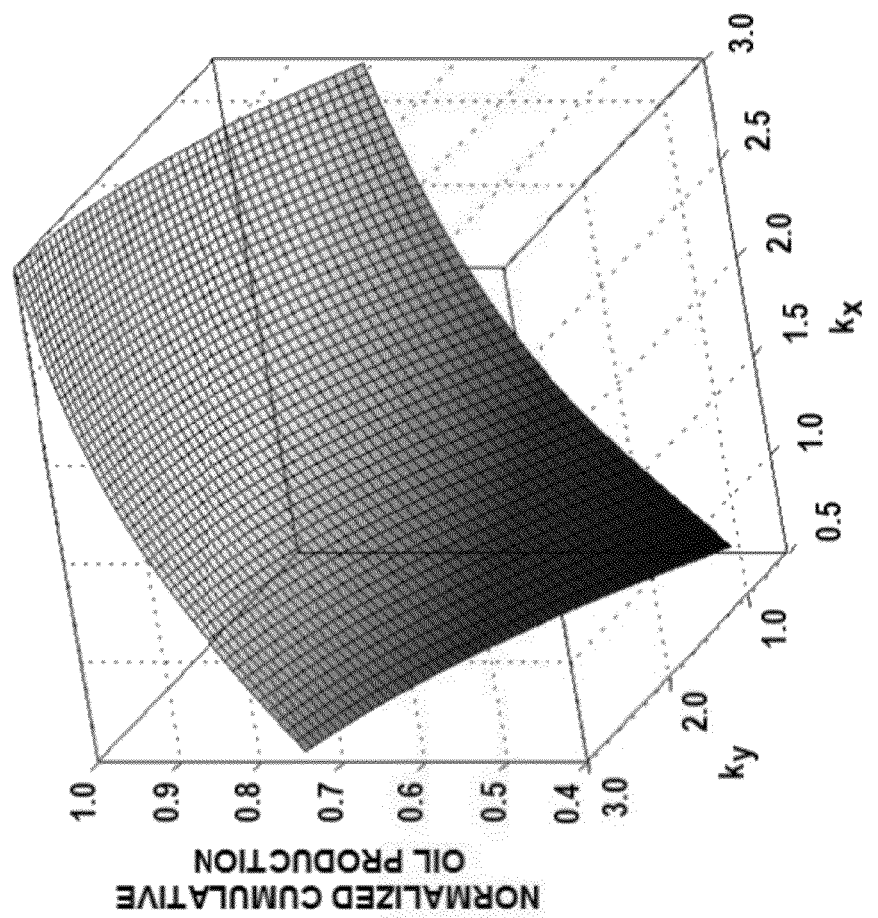
FIG. 3 is a schematic view of a response surface for cumulative field oil production normalized to a reference value of 1, in accordance with an embodiment of the present invention.

FIG. 3 shows a response surface of the cumulative field oil production normalized to a reference value of 1 for this example. The response surface is drawn as a function of the permeability multipliers in the x and y direction, which largely influence the field production. Importantly, this design problem is 5-dimensional, and the projection in the 2D ($k_x$, $k_y$) plane is considered. The concentration of sampling points in the lower-left corner of the $k_x$, $k_y$ space, as discussed in FIG. 2, appear exaggerated by the projection as these points differ in the other remaining three dimensions.

Figure 4:
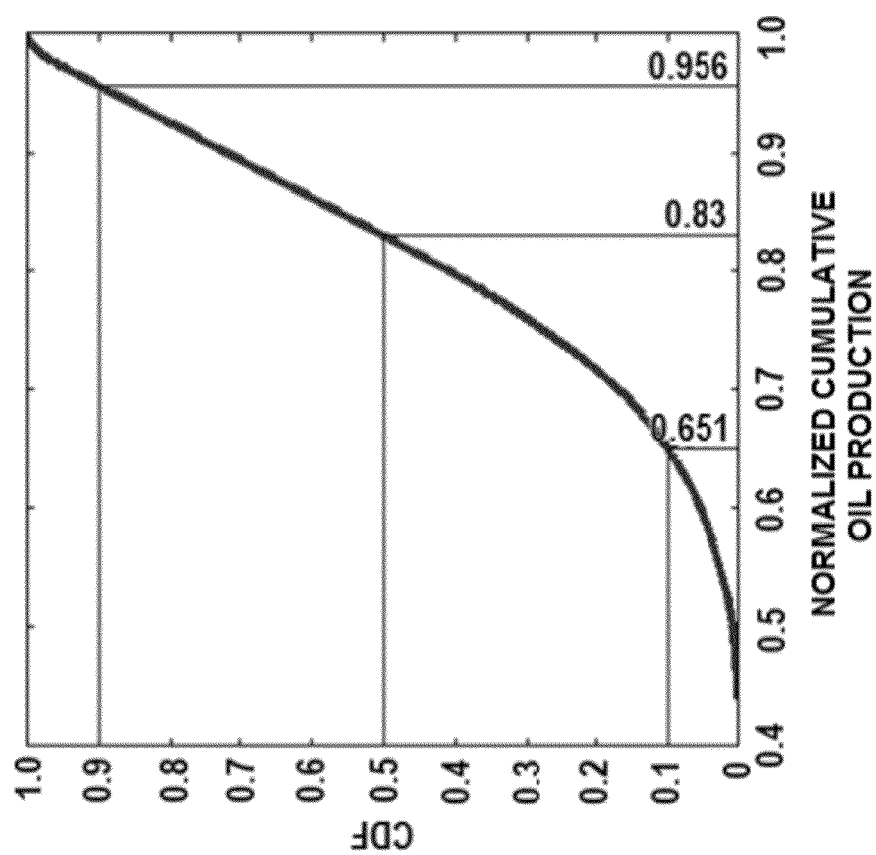
FIG. 4 is a schematic view of a cumulative probability density function (PDF) for cumulative field oil production normalized to a reference value of 1 and generated by Monte Carlo sampling of the response surface shown in FIG. 3, in accordance with the an embodiment of the present invention.

After two iterations and a total of 36 runs (i.e., 16 initial points+2 iterations adding 10 new sampling points each), the iterative response surface method reaches a predetermined precision threshold. In this example, the precision threshold was calculated using 30 points, which are different from the sampling points used in generating the proxy. These 30 points have been generated using a space-filling design and are used for all iterations for a fair comparison. The final proxy thus offers a predictive response surface for cumulative oil production as a function of the five input parameters. The final proxy can be sampled with a Monte-Carlo sampling technique to obtain the probability density function of the cumulative oil produced after 10 years in production, which is shown in FIG. 4. For demonstration purposes, cumulative oil production is normalized to a maximum value of 1. The values for P10, P50, and P90 probabilities of production (i.e., $10^{th}$, 50th, and 90th percentile data points respectively) are also highlighted in FIG. 4.

Testing the response surface on different points is called cross-validation, or sometimes referred to as "blind tests." Here, for demonstration purposes, the response surface has been built with 16, 26, and 36 points at iterations 0, 1, and 2, respectively. Iteration 0, the initialization, was generated using a Folded-Plackett-Burman design. To verify the predictive capability of the response surfaces, full flow simulations were run on a set of 30 points different from the points used to construct the proxy, but consistently identical for each test. A blind test with a high correlation coefficient and a cloud of points aligned with the 45 degree line shows that the proxy is valid away from the points used to construct it. Accordingly, the response surface can be used confidently inside the domain.

Figures 5A, 5B:
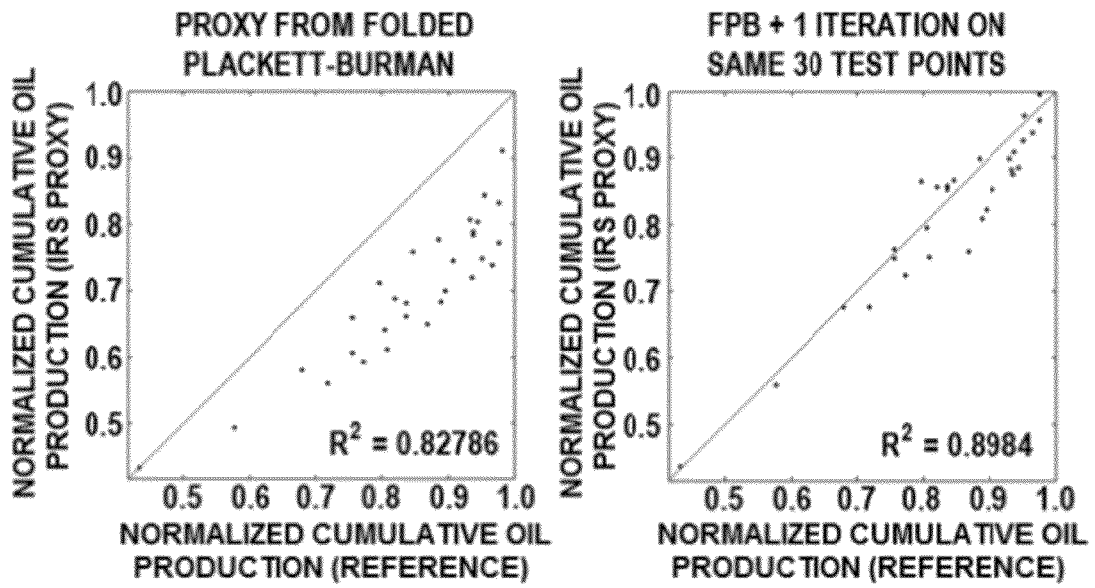
FIGS. 5A-5C are schematic views comparing the fit between the production values predicted by a Folded Plackett-Burman (FPB) proxy at iterations 0 (5A), 1 (5B), and 2 (5C) with the normalized cumulative field oil production computed using full reservoir simulation, in accordance with an embodiment of the present invention.
Figure 5C:
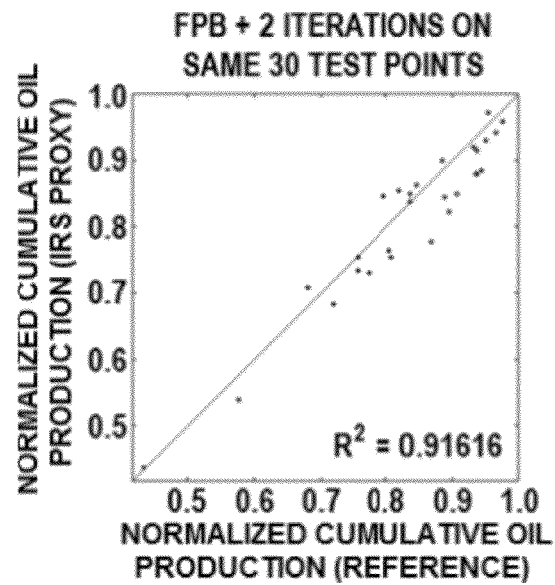

FIGS. 5A-5C show the evolution of the convergence from initialization, to the $1^{st}$ iteration, and to the $2^{nd}$ iteration. The figures show the normalized cumulative field oil production computed by a full simulation on the x-axis (i.e., the reference or actual cumulative oil production) compared with the field oil production estimated from a response surface built at the nth iteration on the y-axis. The blind test points line up closer to the 45-degree line with each iteration. After two iterations the convergence criterion is satisfied indicating that the response surface is stable. The response surface is thus deemed reliable as it is able to accurately predict the results of the 30 simulation runs, which are different from the runs used to build the response surface. The iterative response surface method or process of the present invention is therefore, able to improve the predictive quality of the proxy at each iteration, thus showing a well-behaved convergence to find the most informative locations.

Figure 6A:
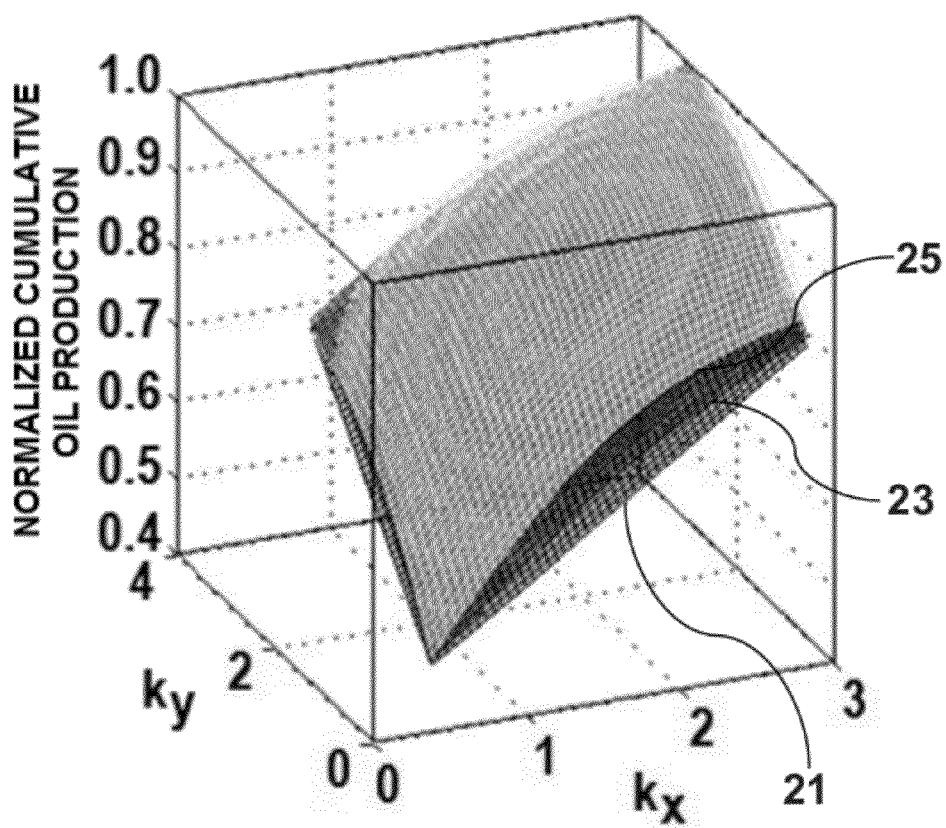
FIG. 6A shows schematic views of response surfaces obtained using a Folded Plackett-Burman, D-Optimal, and Iterative design, in accordance with an embodiment of the present invention.
Figure 6B:
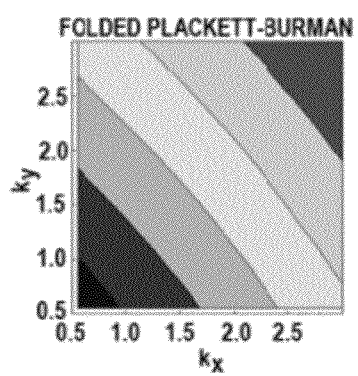
FIGS. 6B-6D show contour plots for the response surfaces obtained using the Folded Plackett-Burman (6B), D-Optimal (6C), and Iterative design (6D).
Figure 6C:
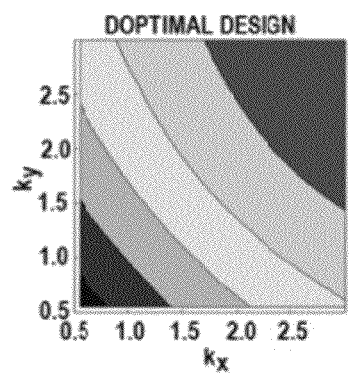
Figure 6D:
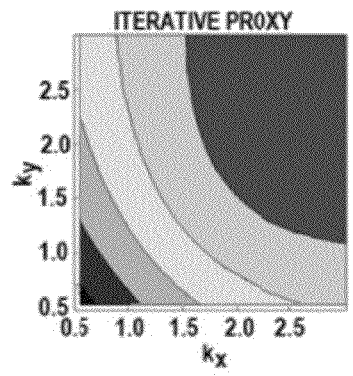

The iterative proxy obtained with 36 runs is now compared with iterative response surfaces with a proxy obtained using a folded Plackett-Burman with 17 runs (16+center point) and a D-Optimal design with 36 runs. Such a comparison is to demonstrate that the iterative response surface method is able to construct more accurate response surfaces for the same number of simulations as a D-Optimal design. The 3D response surfaces obtained with the Folded Plackett-Burman (21), D-Optimal (23), and Iterative (25) methods are shown together on the same projection in FIG. 6A. For clarity, FIGS. 6B-6D show contour plots where response surface values are shade-coded. One skilled in the art will recognize that the Folded Plackett-Burman response surface does not capture the surface curvature accurately, while the D-Optimal captures the correct curvature but does not go beyond second order non-linearities. The iterative response surface proxy according to embodiments of the present invention captures the correct curvature and conforms to the non-linearities of the surface. Therefore, for the same number of runs as a D-Optimal scheme, the iterative response surface offers an improved representation of the system response.

Iterative Response Surfaces for History-Matching

Iterative response surfaces can be used improve the speed and quality of the search for history-matching models. In such problems, the response surface represents the error between observed and simulated data as a function of the uncertainty parameters. As will be described in the examples below, iterative response surfaces can be used to identify the locus of models with the best history-match qualities.

Figure 7:
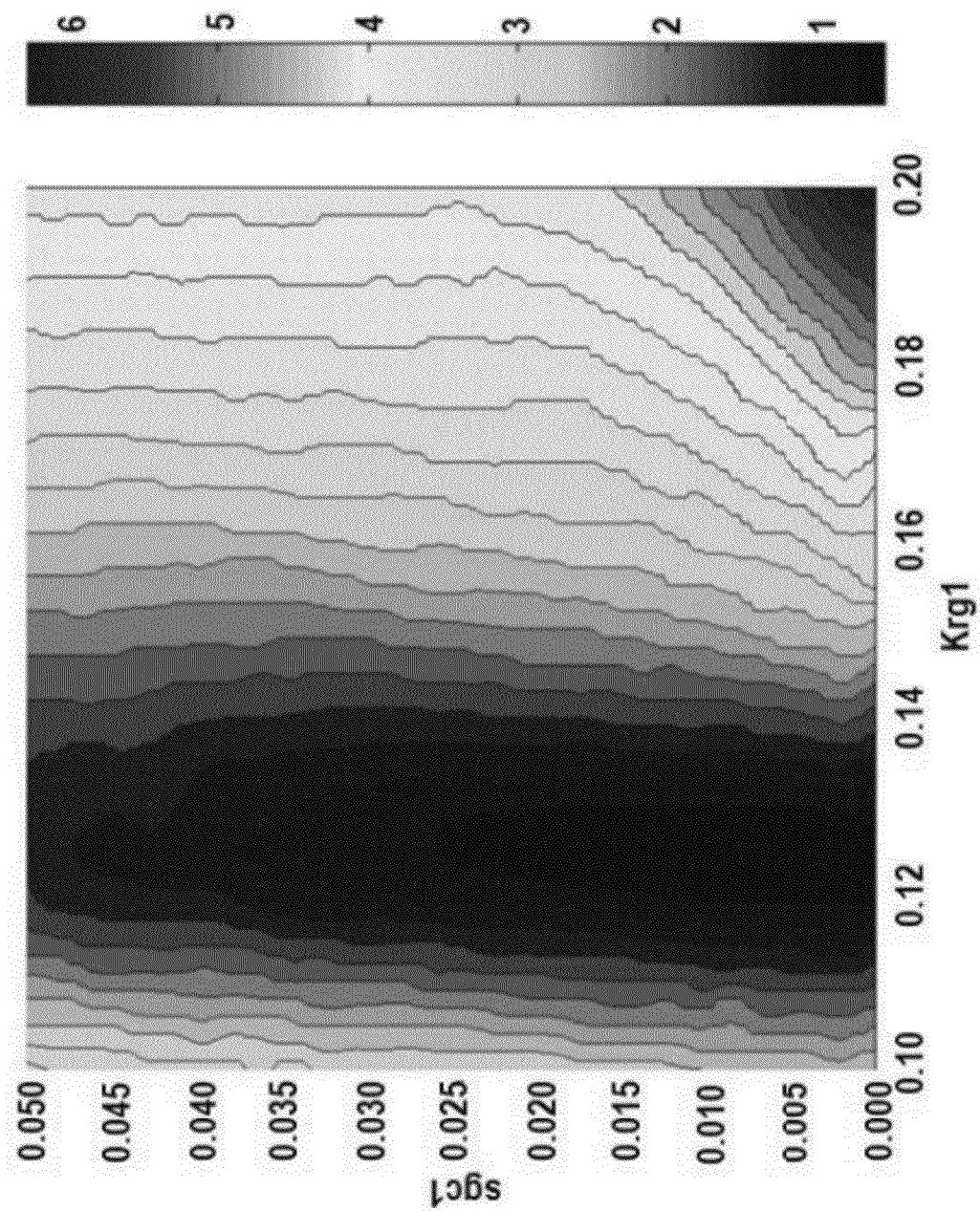
FIG. 7 is a schematic view of a reference response surface for history-match error obtained using a large number of simulation runs.

FIG. 7 shows a 2D contour plot of a reference surface for history-match error as a function of two of six uncertain input parameters used in simulation. This reference response surface is in a non-linear search space with six dimensions and was created by running a large number of simulations (900). The history-match error surfaces are plotted as a function of critical gas saturations and gas end point relative permeability, two of the most influential parameters in this example. The surface is not linear, with the best runs located in the bottom-left quadrant shown by dark shading, which are very close to the worst runs in the bottom-right quadrant.

Figure 8A:
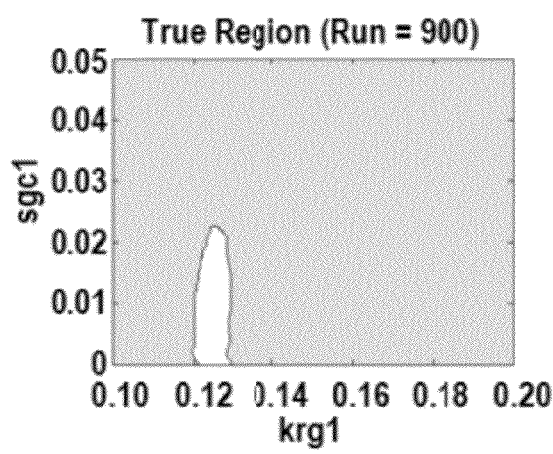
FIGS. 8A-8H are schematic views showing the locus of history-matched models where
Figure 8B:
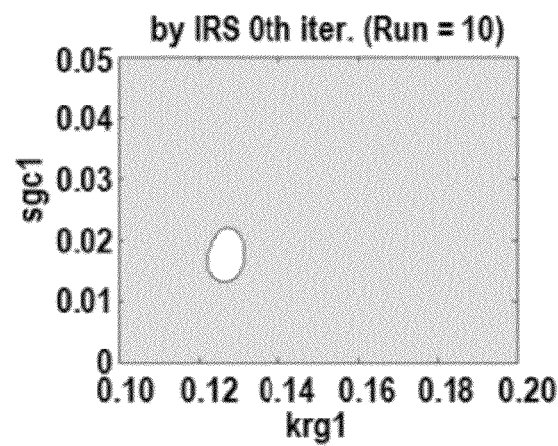
Figure 8C:
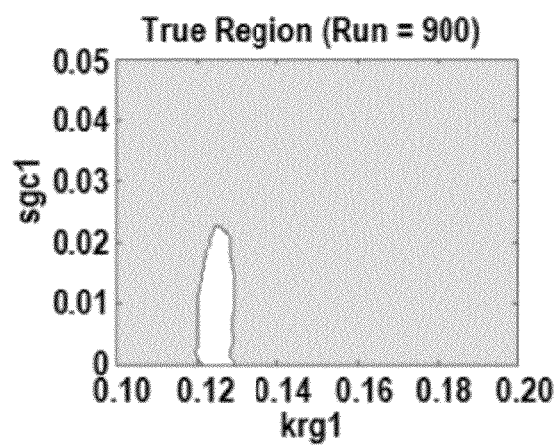
Figure 8D:
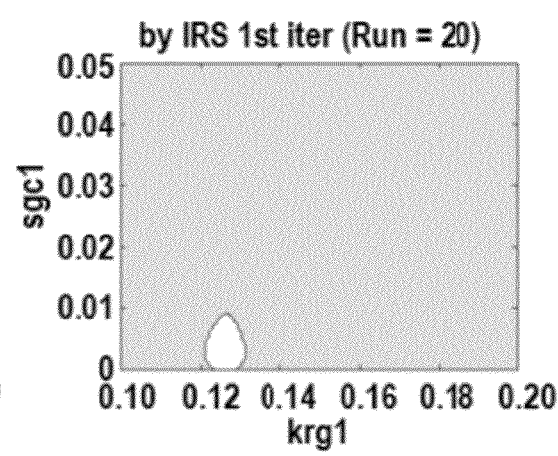
Figure 8E:
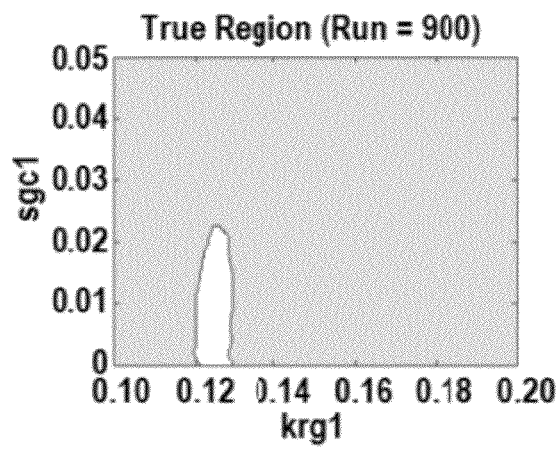
Figure 8F:
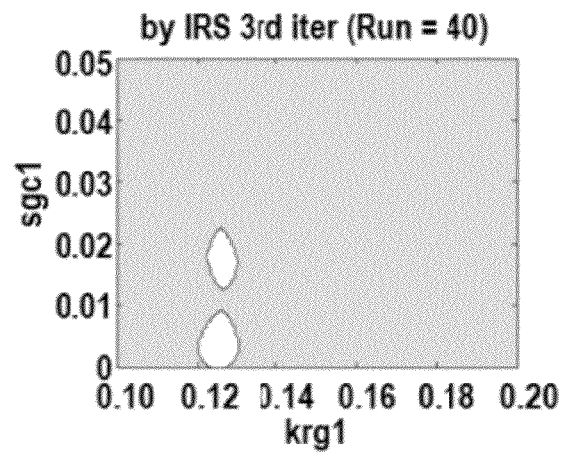
Figure 8G:
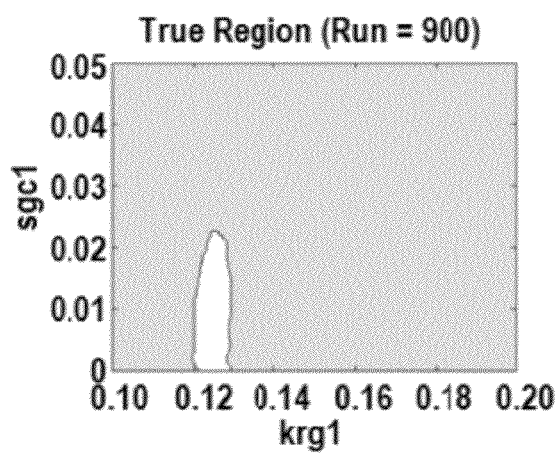
Figure 8H:
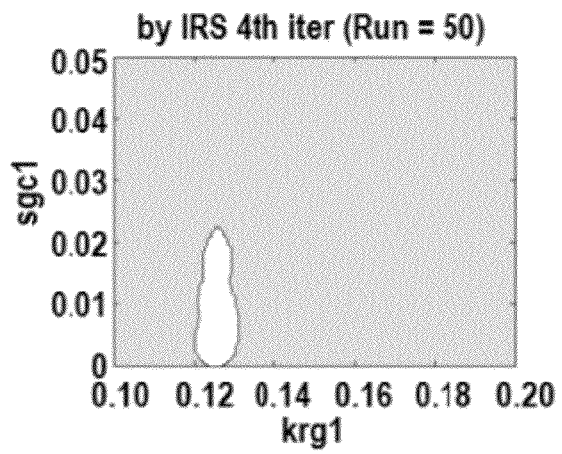

The iterative response surface for history-match error was initialized with a space-filling design of 10 runs and followed with iterations of 10 runs. The response surface converged after a total of 50 runs. The locus of the good history-matches is shown as a function of the number of iterations on FIGS. 8A-8H. FIGS. 8A, 8C, 8E, and 8G show the true-history match reference envelope (shown in white). FIGS. 8B, 8D, 8F, and 8H show the good models of history-matches over various iterations of the response surface. Initialization begins with a small, circular locus of good models (8B). The contours of the good models envelope is progressively diver-sified and improved to resemble the true history-match reference envelope over various iterations as shown in FIGS. 8D, 8F, and 8H.

To verify the robustness of the technique, the response surface is initialized with two different designs (space-filling, as shown in FIGS. 8B, 8D, 8F, & 8H, and D-Optimal). FIGS. 9A and 9B show an example of how different these two designs behave by comparing the choice of new sampling points for the first iteration after initialization for these methods. The points are located based on the previous points and on the score function achieved by the response surface at that stage. The choices of new locations differ significantly for space-filling and for D-Optimal, but after five iterations, the two initial guesses converge to the same result. The final "best match" envelope for D-Optimal (FIG. 10B) looks very similar to the best match envelope for space-filling (FIG. 8H), and both being visually as good as the reference envelope (FIG. 10A).

History-matching error functions are often less linear than field development metrics such as cumulative oil production, but the proxy surfaces generated are still able to capture the surface curvature and non-linearity with a small number of simulation runs. Using iterative response surfaces, the same history-match envelope was obtained using 50 runs as with 900 non-iterative runs. Further, this result was achieved independently of the initial estimation.

This example demonstrates that the iterative response surface method is a frugal technique to improve the description of a non-linear system response by successive calibrations of the sampling strategy. The description of the response surface, and the probability density function obtained by Monte Carlo sampling can be used for predictions inside the domain. The use of splines and the proper combination of gradients, curvature, bending energy, and distance to existing points in the scoring function help to guide the location of the next sampled points. Iterative response surfaces introduce the concept of information in experimental designs: instead of deciding of the location of samples a priori, this method adjusts to the information gathered iteratively during the experience.

The iterative construction of response surfaces according to embodiments of the present invention computes the location of batches of test points as a function of the model behavior. By optimizing the location of test points at each iteration, each batch of experiences improves the knowledge of the system response. The advantageous result is a gain of accuracy and predictive power for the proxy at no additional simulation cost and with a well-behaved convergence behavior. As provided in the above examples, application of this technique has shown to be successful both in a green or undeveloped field situations for optimizing field performance and in brown or developed field situations for matching historical data.

The above described methods can be implemented in the general context of instructions executed by a computer. Such computer-executable instructions may include programs, routines, objects, components, data structures, and computer software technologies that can be used to perform particular tasks and process abstract data types. Software implementations of the above described methods may be coded in different languages for application in a variety of computing platforms and environments. It will be appreciated that the scope and underlying principles of the above described methods are not limited to any particular computer software technology.

Moreover, those skilled in the art will appreciate that the above described methods may be practiced using any one or a combination of computer processing system configurations, including, but not limited to, single and multi-processer systems, hand-held devices, programmable consumer electronics, mini-computers, or mainframe computers. The above described methods may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a compact disc (CD), pre-recorded disk or other equivalent devices, could include a computer program storage medium and program means recorded thereon for directing the computer processor to facilitate the implementation and practice of the above described methods. Such devices and articles of manufacture also fall within the spirit and scope of the present invention.

As will be described, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

Figure 11:
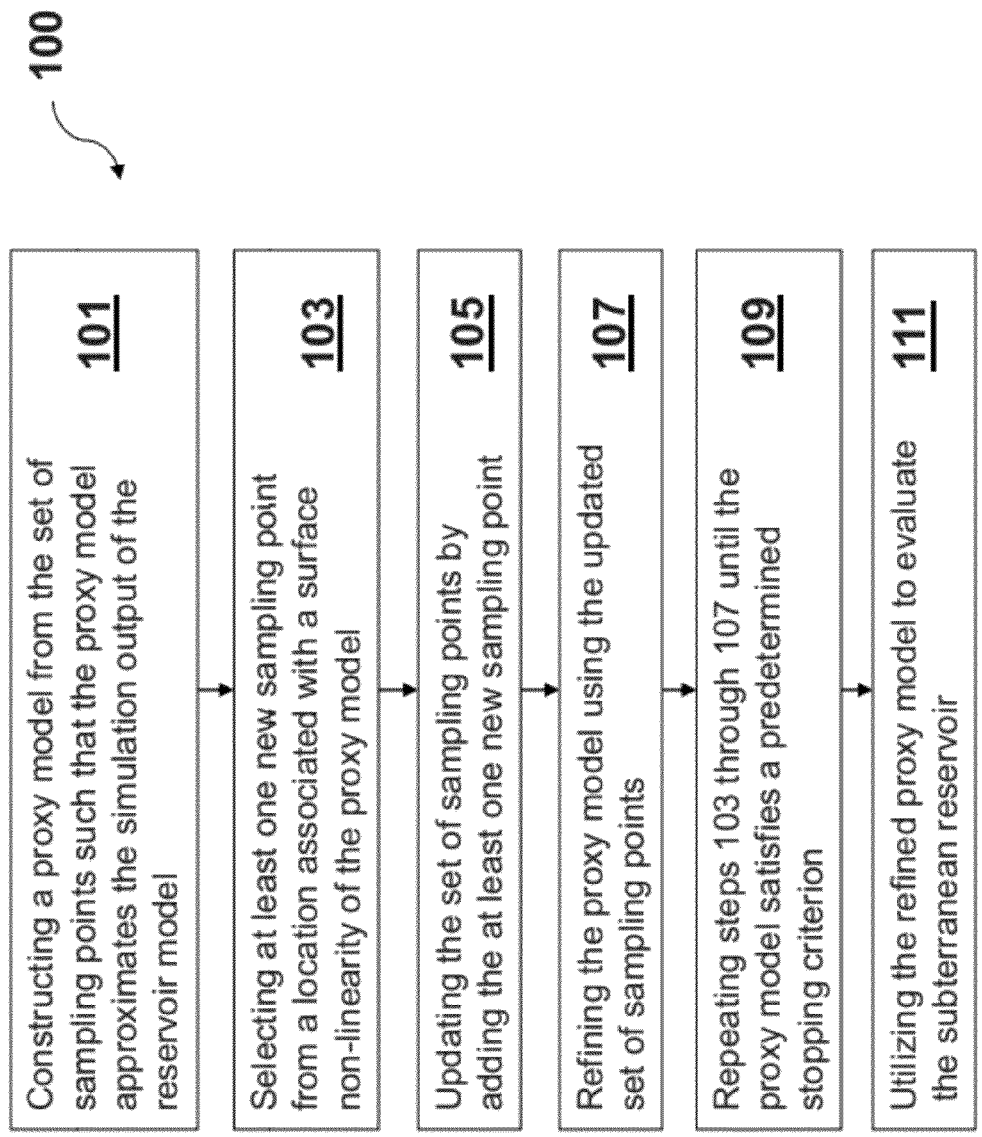
FIG. 11 is a flowchart illustrating a method for utilizing proxy models to evaluate a subterranean reservoir, in accordance with an embodiment of the present invention.

FIG. 11 illustrates a flow diagram showing computer-implemented method 100 for evaluating a subterranean reservoir using iteratively constructed proxy models (e.g., response surfaces) according to an embodiment of the present invention. In step 101, a proxy model is constructed from an initial set of sampling points such that the proxy model approximates a simulation output of a reservoir model. The sampling points can be obtained using any appropriate experimental design technique, such as Plackett-Burman, D-optimal, Latin Hypercube, or Hammersley sequence. The simulation output, such as a production forecast, is typically the result of simulating the reservoir model for the set of sampling points, which are spread across the input variable distribution (simulation input deck). Accordingly, the proxy model can be a response surface representing cumulative field oil production as a function of multiple uncertainty sources sampled from an input variable distribution.

In step 103, one or more new sampling points are selected from locations associated with surface non-linearities of the proxy model. Step 103 can be completed using a score function S. For example, each new sampling point can be selected based on a value of the proxy model at the new sampling point location, a scalar gradient of the proxy model at the new sampling point location, a bending energy of the proxy model at the new sampling point location, a curvature of the proxy model at the new sampling point location, a distance between locations of each sampling point used to construct the proxy model and the new sampling point location, or a combination thereof.

The set of sampling points is updated in step 105 by adding the new sampling points selected in step 103. The proxy model is refined in step 107 using the updated set of sampling points. Steps 103 through 107 are iteratively repeated in step 109 until the proxy model satisfies a predetermined stopping criterion, such as a change between two successive proxy models being less than a predetermined threshold. The refined proxy model is utilized in step 111 to evaluate the subterranean reservoir. In one embodiment, the refined proxy model is utilized in step 111 to forecast simulation outputs of the reservoir model. In other embodiments, the refined proxy model is utilized in step 111 for testing asset development procedures such as uncertainty assessments, history-matching and optimization of development plans. As one skilled in the art will appreciate, the results of evaluating the subterranean reservoir can be utilized in performing oilfield operations. For example, they can be used to make equipment improvements, such as to surface facilities, or for determining where to drill additional wells for increasing production. Injection and production flow rates can also be optimized, such as by altering various flow control devices (e.g., chokes or orifices). This can also impact relative rates at which oil, water and gas are produced from each wellbore. Any physical action associated with pattern balancing through injection and production rate allocation, locating and producing by-passed oil pockets, and tracking fluid displacements (in production, injection, or storage) can also be performed.

Figure 12:
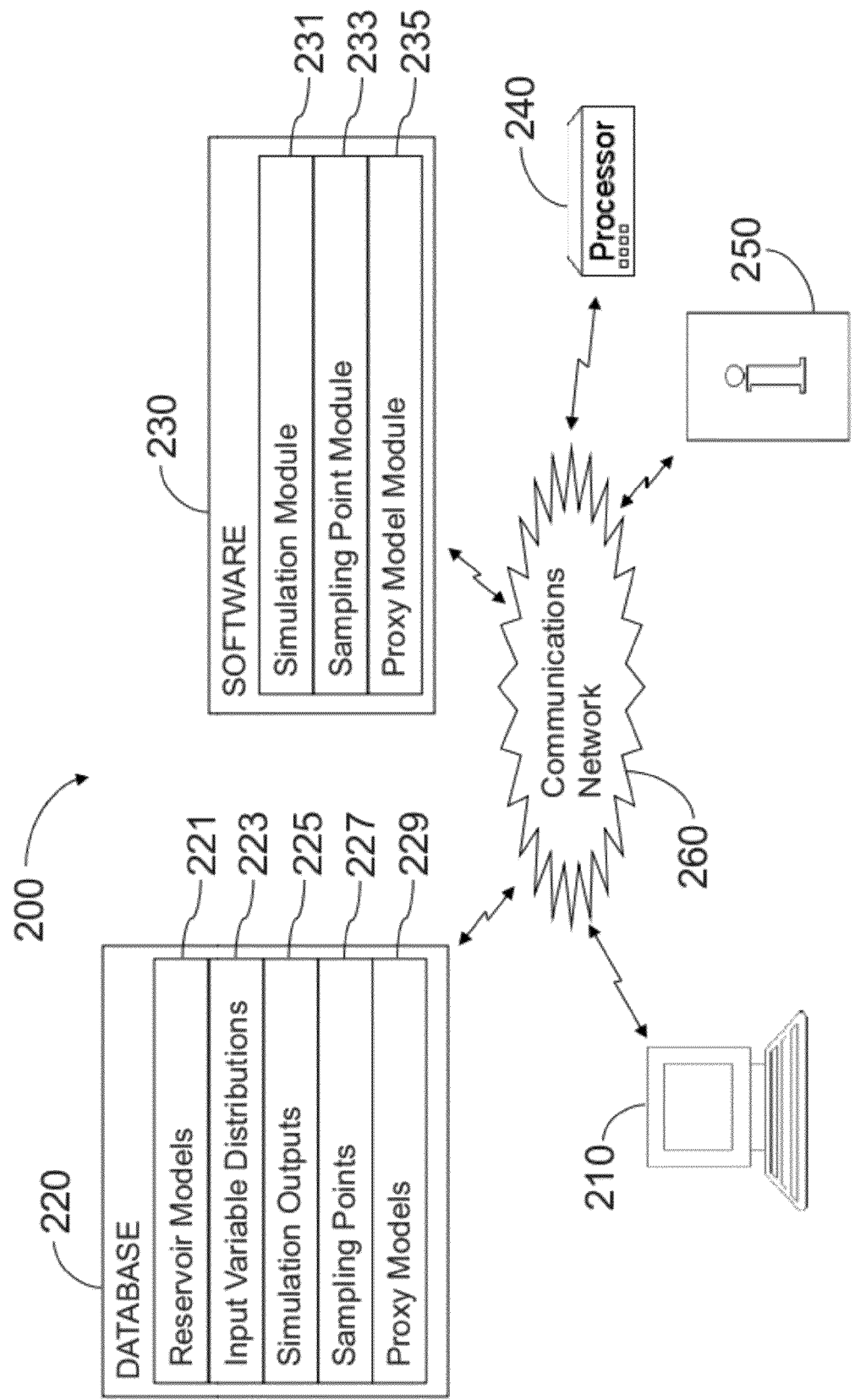
FIG. 12 is a schematic illustrating a system for utilizing proxy models to evaluate a subterranean reservoir, in accordance with an embodiment of the present invention.

FIG. 12 illustrates system 200 that can be used to perform the iterative response surface methods, such as computer-implemented method 100, previously described herein. System 200 includes user interface 210, such that an operator can actively input information and review operations of system 200. User interface 210 can be any means in which a person is capable of interacting with system 200 such as a keyboard, mouse, touch-screen display, or voice-command controls. Operator-entered data input into system 200 through user interface 210 can be stored in a database 220. Additionally, any information generated by system 200 can also be stored in database 220. For example, database 220 can store user-defined parameters, as well as, system generated computed solutions. Accordingly, reservoir models 221, input variable distributions 223, simulation outputs 225, sampling points (and sampling point scores) 227, and proxy models 229 are all examples of information that can be stored in database 220.

System 200 includes a computer program product or software 230 that is stored on a non-transitory computer usable or processor readable medium. Current examples of such non-transitory medium include, but are not limited to, read-only memory (ROM) devices, random access memory (RAM) devices and semiconductor-based memory devices. This includes flash memory devices, programmable ROM (PROM) devices, erasable programmable ROM (EPROM) devices, electrically erasable programmable ROM (EEPROM) devices, dynamic RAM (DRAM) devices, static RAM (SRAM) devices, magnetic storage devices (e.g., floppy disks, hard disks), optical disks (e.g., compact disks (CD-ROMs)), and integrated circuits. Non-transitory medium can be transportable such that the one or more computer programs (i.e., a plurality of instructions) stored thereon can be loaded onto a computer resource such that when executed on the one or more computers or processors, performs the aforementioned functions of the various embodiments of the present invention.

As will be described more fully herein, software 230 can include a variety of software modules including, but not limited to, simulation module 231, sampling point module 233, and proxy model module 235. Processor 240 interprets instructions or program code encoded on the non-transitory medium to execute software 230, as well as, generates automatic instructions to execute software for system 200 responsive to predetermined conditions. Instructions from both user interface 210 and software 230 are processed by processor 240 for operation of system 200. In some embodiments, a plurality of processors 240 can be utilized such that system operations can be executed more rapidly.

In certain embodiments, system 200 can include reporting unit 250 to provide information to the operator or to other systems (not shown). For example, reporting unit 250 can be a printer, display screen, or a data storage device. However, it should be understood that system 200 need not include reporting unit 250, and alternatively user interface 210 can be utilized for reporting information of system 200 to the operator.

Communication between any components of system 200, such as user interface 210, database 220, software 230, processor 240 and reporting unit 250 can be transferred over a communications network 260. Communications network 260 can be any means that allows for information transfer to facilitate sharing of knowledge and resources. Examples of such a communications network 260 include, but are not limited to, personal area networks (PANs), local area networks (LANs), wide area networks (WANs), campus area networks (CANs), and virtual private networks (VPNs). Communications network 260 can also include any hardware technology or equipment used to connect individual devices in the network, such as by wired technologies (e.g., twisted pair cables, co-axial cables, optical cables) or wireless technologies (e.g., radio waves).

In operation, system 200 is populated with input including reservoir model 221 and input variable distribution 223. As previously described, input variable distribution 223 can include global and local field properties, and typically is input in a simulation input deck. The operator can also input termination criteria and other operational information into the system, through user interface 210, such as a maximum number of iterations, a number of runs per iteration, and a convergence criterion to stop the system 200 if changes between two successive proxy models are smaller than a predetermined threshold.

The system can be initialized using any appropriate experimental design technique, such as Plackett-Burman, D-optimal, Latin Hypercube, or Hammersley sequence. Such initialization results in the production of initial sampling points 227 and can be performed using sampling point module 233. Proxy model module 235 generates an initial proxy model 229, such as a thin-plate spline function, using the initial sampling points 227. Accordingly, proxy model 229 approximates simulation outputs 225, which can be obtained using simulation module 231, by simulating reservoir model 221 for a set of sampling points 227 that are spread across input variable distributions 223. Sampling point module 233 generates a large set of candidate locations on proxy model 229 that sufficiently cover the search space. Sampling point module 233 is also configured to calculate a sampling point score for each candidate location, such as by using score function S previously described herein. One or more candidates with the highest combined score are selected as new sampling points 227 and are used in the next iteration to generate refined proxy model 229. Sampling/scoring with sampling point module 233 to obtain new sampling points 227 and constructing refined proxy models 229 using proxy model module 235 can continue until a predetermined convergence or system termination criteria is satisfied. The refined proxy model 229 can then be used by system 200 to predict simulator responses at unsampled locations and/or test asset development procedures such as uncertainty quantification, history-matching, field optimization, or a combination thereof.

A visual display can be produced, such as through reporting unit 250 or user interface 210. For example, the output obtained using refined proxy model 229 can be transformed into image data representations for display to a user or operator. Accordingly, "producing a visual display" or "display" or "displaying" includes any direct or indirect acts (electronically or physically) to report information or outputs of system 200. The displayed information can be utilized to forecast or optimize the production performance of the subterranean reservoir, or used in making other reservoir management decisions.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for evaluating a subterranean reservoir, the method comprising:
   (a) constructing a proxy model from a set of sampling points such that the proxy model approximates a simulation output of a reservoir model;
   (b) selecting at least one new sampling point from a set of candidate locations based on criteria associated with a surface non-linearity of the proxy model, wherein the at least one new sampling point is selected based on gradients of the proxy model at the set of candidate locations;
   (c) updating the set of sampling points by adding the at least one new sampling point;
   (d) refining the proxy model using the updated set of sampling points;
   (e) repeating steps (b) through (d) until the proxy model satisfies a predetermined stopping criterion; and
   (f) utilizing the refined proxy model to evaluate the subterranean reservoir.

2. The method of claim 1, wherein the proxy model comprises a thin-plate spline regression model.

3. The method of claim 1, wherein the at least one new sampling point is also selected based on values of the proxy model at the set of candidate locations.

4. The method of claim 1, wherein the at least one new sampling point is also selected based on curvatures of the proxy model at the set of candidate locations.

5. The method of claim 1, wherein the at least one new sampling point is also selected based on bending energies of the proxy model at the set of candidate locations.

6. The method of claim 1, wherein the at least one new sampling point is also selected based on distances between the set of candidate locations and the set of sampling points existing in the proxy model.

7. The method of claim 1, wherein the set of sampling points represents reservoir properties or field properties.

8. The method of claim 1, wherein the predetermined stopping criterion comprises a change between two successive proxy models being less than a predetermined threshold.

9. The method of claim 1, wherein the utilizing the refined proxy model to evaluate the subterranean reservoir comprises using the refined proxy model to forecast simulation outputs of the reservoir model.

10. The method of claim 1, wherein the utilizing the refined proxy model to evaluate the subterranean reservoir comprises using the refined proxy model for testing asset development procedures.

11. The method of claim 1, wherein the simulation output of the reservoir model is obtained by simulating the reservoir model for the set of sampling points that are spread across an input variable distribution.

12. A system for evaluating a subterranean reservoir, the system comprising:
    a database configured to store data comprising a reservoir model representing a subterranean reservoir, an input variable distribution, simulation outputs of the reservoir model, sampling points, and proxy models;
a computer processor configured to receive the stored data from the database, and to execute software using the stored data; and
a software program executable on the computer processor to implement a method, the method comprising:
(a) constructing a proxy model from a set of sampling points such that the proxy model approximates a simulation output of the reservoir model, wherein the set of sampling points are spread across the input variable distribution;
(b) selecting at least one new sampling point from a set of candidate locations based on criteria associated with a surface non-linearity of the proxy model, wherein the at least one new sampling point is selected based on gradients of the proxy model at the set of candidate locations;
(c) updating the set of sampling points by adding the at least one new sampling point;
(d) refining the proxy model using the updated set of sampling points;
(e) repeating steps (b) through (d) until the proxy model satisfies a predetermined stopping criterion; and
(f) utilizing the refined proxy model to evaluate the subterranean reservoir.

13. The system of claim 12, wherein the at least one new sampling point is also selected based on values of the proxy model at the set of candidate locations, bending energies of the proxy model at the set of candidate locations, curvatures of the proxy model at the set of candidate locations, distances between the set of candidate locations and the set of sampling points existing in the proxy model, or a combination thereof.

14. The system of claim 12, wherein the system further comprises a display such that results from evaluation of the subterranean reservoir using the refined proxy model are transformed into image representations that are output to the display.

15. The system of claim 12, wherein the software program is further executable on the computer processor to simulate the reservoir model for the set of sampling points that are spread across the input variable distribution to obtain the simulation outputs of the reservoir model.

16. A computer program product, comprising a non-transitory computer usable medium having a computer readable program code embodied therein, the computer readable program code configured to be executed to implement a method for evaluating a subterranean reservoir, the method comprising:
(a) constructing a proxy model from a set of sampling points such that the proxy model approximates a simulation output of the reservoir model;
(b) selecting at least one new sampling point from a set of candidate locations based on criteria associated with a surface non-linearity of the proxy model, wherein the at least one new sampling point is selected based on gradients of the proxy model at the set of candidate locations;
(c) updating the set of sampling points by adding the at least one new sampling point;
(d) refining the proxy model using the updated set of sampling points;
(e) repeating steps (b) through (d) until the proxy model satisfies a predetermined stopping criterion; and
(f) utilizing the refined proxy model to evaluate the subterranean reservoir.

17. The computer program product of claim 16, wherein the at least one new sampling point is also selected based on values of the proxy model at the set of candidate locations, bending energies of the proxy model at the set of candidate locations, curvatures of the proxy model at the set of candidate locations, distances between the set of candidate locations and the set of sampling points existing in the proxy model, or a combination thereof.

18. The method of claim 1, wherein the gradients of the proxy model at the set of candidate locations are scalar gradients of the proxy model at the set of candidate locations.

19. The method of claim 1, wherein the at least one new sampling point is also selected based on values of the proxy model at the set of candidate locations, bending energies of the proxy model at the set of candidate locations, curvatures of the proxy model at the set of candidate locations, distances between the set of candidate locations and the set of sampling points existing in the proxy model, or a combination thereof.

20. The method of claim 1, wherein the at least one new sampling point is also selected based on a score function computed for each candidate location of the set of candidate locations, wherein the score function is:

$$\text{Score} = \epsilon_1 s + \epsilon_2 |\nabla s| + \epsilon_3 \sqrt{(\Delta s)} + \epsilon_4 \kappa(s) + \epsilon_5 d$$

wherein s corresponds to a value of the proxy model at a particular candidate location;
wherein $|\nabla s|$ corresponds to the gradient of the proxy model at the particular candidate location;
wherein $\sqrt{(\Delta s)}$ corresponds to a bending energy of the proxy model at the particular candidate location;
wherein $\kappa(s)$ corresponds to a curvature of the proxy model at the particular candidate location;
wherein d corresponds to a distance of the particular candidate location and the set of sampling points existing in the proxy model; and
wherein $\epsilon_1$, $\epsilon_2$, $\epsilon_3$, $\epsilon_4$, and $\epsilon_5$ are weighting coefficients obtained from linear regression using the set of sampling points existing in the proxy model.

21. The method of claim 20, wherein the gradient of the proxy model at the particular candidate location is a scalar gradient of the proxy model at the particular candidate location.

22. The system of claim 12, wherein the gradients of the proxy model at the set of candidate locations are scalar gradients of the proxy model at the set of candidate locations.

23. The system of claim 12, wherein the at least one new sampling point is also selected based on a score function computed for each candidate location of the set of candidate locations, wherein the score function is:

$$\text{Score} = \epsilon_1 s + \epsilon_2 |\nabla s| + \epsilon_3 \sqrt{(\Delta s)} + \epsilon_4 \kappa(s) + \epsilon_5 d$$

wherein s corresponds to a value of the proxy model at a particular candidate location;
wherein $|\nabla s|$ corresponds to the gradient of the proxy model at the particular candidate location;
wherein $\sqrt{(\Delta s)}$ corresponds to a bending energy of the proxy model at the particular candidate location;
wherein $\kappa(s)$ corresponds to a curvature of the proxy model at the particular candidate location;
wherein d corresponds to a distance of the particular candidate location and the set of sampling points existing in the proxy model; and
wherein $\epsilon_1$, $\epsilon_2$, $\epsilon_3$, $\epsilon_4$, and $\epsilon_5$ are weighting coefficients obtained from linear regression using the set of sampling points existing in the proxy model.

24. The system of claim 23, wherein the gradient of the proxy model at the particular candidate location is a scalar gradient of the proxy model at the particular candidate location.

25. The computer program product of claim 16, wherein the gradients of the proxy model at the set of candidate locations are scalar gradients of the proxy model at the set of candidate locations.

26. The computer program product of claim 16, wherein the at least one new sampling point is also selected based on a score function computed for each candidate location of the set of candidate locations, wherein the score function is:

$$\text{Score} = \epsilon_1 s + \epsilon_2 |\nabla s| + \epsilon_3 \sqrt{(\Delta s)} + \epsilon_4 \kappa(s) + \epsilon_5 d$$

wherein s corresponds to a value of the proxy model at a particular candidate location;

wherein $|\nabla s|$ corresponds to the gradient of the proxy model at the particular candidate location;

wherein $\sqrt{(\Delta s)}$ corresponds to a bending energy of the proxy model at the particular candidate location;

wherein $\kappa(s)$ corresponds to a curvature of the proxy model at the particular candidate location;

wherein d corresponds to a distance of the particular candidate location and the set of sampling points existing in the proxy model; and wherein $\epsilon_1$, $\epsilon_2$, $\epsilon_3$, $\epsilon_4$, and $\epsilon_5$ are weighting coefficients obtained from linear regression using the set of sampling points existing in the proxy model.

27. The computer program product of claim 26, wherein the gradient of the proxy model at the particular candidate location is a scalar gradient of the proxy model at the particular candidate location.

* * * * *